July 26, 1960 F. M. ATKINSON ET AL 2,946,626

SUCTION-PRESSURE UNLOADING SYSTEM

Filed May 31, 1957 2 Sheets-Sheet 1

INVENTORS
FREDERICK M. ATKINSON
ALBERT LEIGH PAULSEN
DAVID F. MATTSON
BY Williamson, Schroeder, Adams & Meyers.
ATTORNEYS INVENTORS
FREDERICK M. ATKINSON
ALBERT LEIGH PAULSEN
DAVID F. MATTSON
BY
Williamson, Schroeder, Adams & Meyers
ATTORNEYS United States Patent Office 2,946,626
Patented July 26, 1960

2,946,626

SUCTION-PRESSURE UNLOADING SYSTEM

Frederick M. Atkinson, Wayzata, and Albert Leigh Paulsen and David F. Mattson, Minneapolis, Minn., assignors to Atkinson Bulk Transport Company, Minneapolis, Minn., a corporation of Minnesota Filed May 31, 1957, Ser. No. 662,759

8 Claims. (Cl. 302—23)

This invention relates to unloading systems. More particularly it relates to systems for unloading pulverulent materials such as flour, chemicals and the like from large containers such as railroad cars, large rubber shipping bags, etc., and for conveying the same to relatively remote locations.

In unloading flour or other pulverulent materials from railroad cars or other large shipping containers, it is often necessary to convey the pulverulent material substantial distances. Moreover, many such containers and especially railroad cars, have been conventionally constructed so that there is insufficient clearance therebelow within which to attach the most efficient means of conveying such material. As a result, many relatively inefficient systems are being used today to empty such containers and to move their contents to the desired locations. Such unloaders generally utilize a pneumatic system wherein relatively small volumes of pulverulent material are mixed with relatively large volumes of air and entrained in the latter and carried thereby to the desired location. Such unloaders introduce free air into the system at some point, either at the point of entry of the pulverulent material or closely adjacent thereto so that the material is withdrawn and conveyed pneumatically in sharp contrast to a fluidized flow. In pneumatic handling, however, such large volumes of air are utilized that large and expensive filters are required to collect the material after it reaches its destination. Moreover, the amount of power required to effect the withdrawal and conveyance of the pulverulent material is unnecessarily large and hence such a system is not satisfactorily efficient. Our invention is directed toward overcoming these disadvantages.

In referring to a fluidized flow in contrast to pneumatic handling, we refer to a flow of the pulverulent material which appears to be all pulverulent material much like a stream of water and is characterized by having a material to air ratio by weight of approximately twenty five or more to one, respectively. The stream generally has a bulk density approximately fifty times or more greater than the bulk density of a pneumatic flow of the pulverulent material. The stream appears to be a solid flow in contrast to pneumatic handling wherein it is obviously visually apparent that there is a relatively small amount of pulverulent material entrained in a relatively large volume of air because an object on one side of such a flow is plainly visible to an observer stationed on the opposite side. The volume of air utilized in conveying a given amount of material in a fluidized flow is only a very small fraction of the volume of air utilized in conveying the same material by pneumatic conveying. Actually, there is some air mixed with the pulverulent material in a fluidized flow, but, for flour, for example, it generally amounts to one pound of air to every 25–75 pounds of flour whereas in pneumatic conveying of flour, approximately one to three pounds of air are generally used to convey a single pound of flour. In pneumatic conveying the air travels at relatively high velocities in the neighborhood of 2,000 to 5,000 feet per minute while in fluidized handling the air and flour generally travel between approximately 300 and 1,000 feet per minute but may, under certain conditions exceed 1,000 feet per minute and even approach 2,000 feet per minute. In addition, pressures utilized in pneumatic conveying are generally below one pound per square inch while in fluidized handling, higher pressures in the neighborhood of three to ten pounds are generally used and may go even higher.

It is a general object of our invention to provide a novel and improved unloading system for unloading pulverulent materials from railroad cars and the like.

A more specific object is to provide a novel and improved unloading system for unloading pulverulent materials from railroad cars and the like of relatively simple and inexpensive construction and operation.

A still more specific object is to provide a novel and improved unloading system for unloading pulverulent materials from railroad cars and the like which will withdraw and convey to a remote location the pulverulent materials in a relatively solid flow characterized by having a material to air ratio by weight of approximately 25 or more to one, respectively.

Another object is to provide a novel and improved unloading system for unloading pulverulent materials from railroad cars which has a minimum of power requirements and lower equipment costs than that utilized in conventional pneumatic unloading systems.

Another object is to provide a novel and improved unloading system for unloading pulverulent materials from railroad cars and the like which effects the withdrawal and conveyance of pulverulent materials to remote locations without the need for any relatively expensive filters.

Another object is to provide a novel and improved unloading system for unloading pulverulent materials from railroad cars and the like which is constructed and arranged so as to avoid the formation of large quantities of dust in the conveyance of pulverulent material.

These and other objects and advantages of our invention will more fully appear from the following description, made in connection with the accompanying drawings, wherein like reference characters refer to the same or similar parts throughout the several views, and in which.

Figure 1:
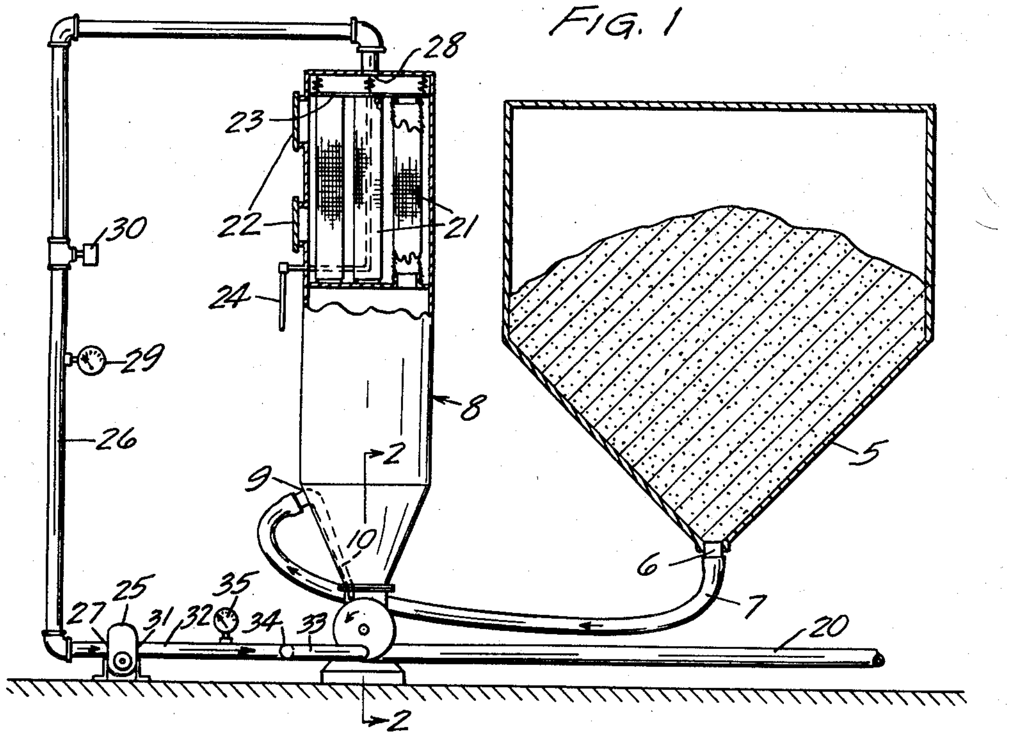
Fig. 1 is a diagrammatic view illustrating one embodiment of our invention.
Figure 2:
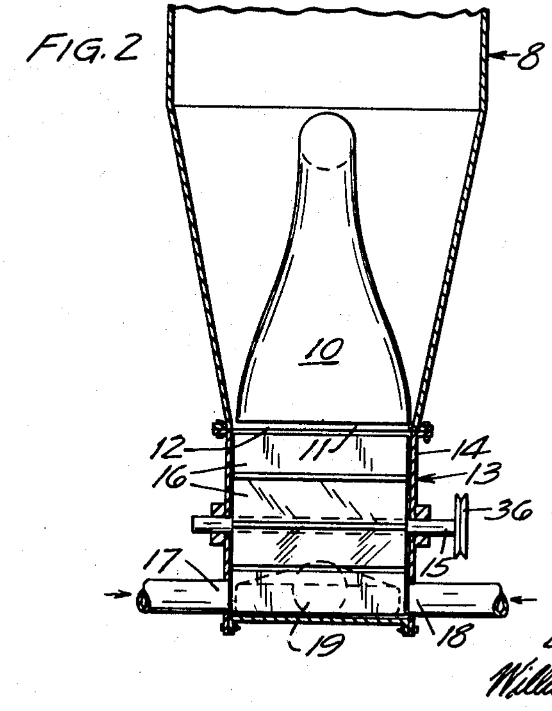
Fig. 2 is a vertical sectional view of the blower of Fig. 1 on an enlarged scale.
Figure 3:
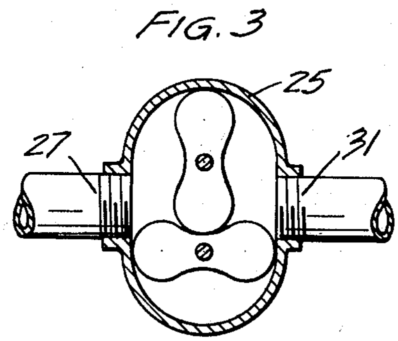
Fig. 3 is a sectional view on an enlarged scale taken along line 3—3 of Fig. 1.

Figs. 1–3 illustrate one embodiment of our invention wherein a bin or container 5 has tapered lower walls which terminate in a discharge outlet 6 to which is connected a suction conduit 7. In the unit which we have constructed and operated, this suction conduit is four inches in diameter and approximately eight feet long and extends over to a separator indicated generally as 8. As shown, the suction conduit connects with the separator 8 at its inlet 9 and extends downwardly within the interior of the lower portions thereof as shown in broken lines in Fig. 1 and in section in Fig. 2. The suction conduit 7 has a discharge terminal 10 with a discharge outlet 11 disposed immediately adjacent the material inlet indicated by the numeral 12 of an actuator 13. As shown, the actuator 13 is disposed immediately below the separator 8 and is connected to the bottom thereof to receive pulverulent material therefrom as the pulverulent material is discharged into the lower portion of the separator.

The actuator 13 as shown, includes a rotor 14 mounted on a shaft 15 for rotation therewith and having circumferentially spaced radially extending blades 16. The construction of this actuator is similar to that shown in U.S. Letters Patent No. 2,779,634 with the exception that it is provided with double air inlets 17 and 18, one at each end of the actuator disposed oppositely relative to each other. It is also provided with a tangentially arranged discharge outlet 19 to which is connected a discharge conduit 20, the latter serving to confine and direct the fluidized flow to the desired remote location.

It will be noted that the terminal portion 10 of the suction conduit 7 has its discharge outlet 11 at its lower end which terminates approximately 1.5 inches from the outer ends of the radial blades 16. The discharge terminal 10 is directed downwardly in the direction of rotation of the blades 16 and it is arranged along the side of the material inlet 12 toward which the blade 16 rotates in order to aid in the entrapment of the pulverulent material as it is discharged into the compartments defined by the adjacent blades 16 as they pass beneath the material inlet 12.

By reference to Fig. 1 and 2 it can be seen that the discharge terminal of the suction conduit 7 is flattened and in its longest transverse dimension extends along the side of the material inlet the full length of the blades 16. It is relatively narrow in its other transverse dimension as can be seen by reference to Fig. 1 and thus is smaller in its cross-sectional area than the area between the outer ends of the adjacent blades 16. The cross-sectional diameter, however, of the discharge outlet is substantially equal to the cross-sectional diameter of the remainder of the suction conduit 7. As the pulverulent material is discharged into the material inlet 12 and into the compartments defined by the blades 16, some of the air travelling therewith rises, carrying with it a minimum of dust. This air passes through a plurality of simple tubular filters of fabricated construction well known in the art and relatively inexpensive to manufacture. As best shown in Fig. 1, the air escaping is forced to pass through these tubular filters 21 and into the upper portion of the separator in the area above the filters. The upper portion of the separator is provided with clean-out doors 22 and the filters are mounted on a spider such as 23 and are provided with shaker means 24, by means of which the filters 21 may be manually shaken periodically to cause the collected dust to shake free of the filters and descend into the material inlet 12.

The air which passes upwardly through the filters is removed by a rotary-positive-displacement-type blower 25 which has a conduit 26 connecting the blower air inlet or intake 27 to the air outlet 28 of the separator. This can best be seen in Fig. 1. A vacuum guage 29 is connected to the conduit 26. Between the blower 25 and the separator 8 is a vacuum release valve 30. The blower 25 must be of a type capable of producing at least a pressure of 3.5 p.s.i. while discharging a maximum of 400 c.f.m., though generally considerably less.

The blower 25 has an air discharge outlet 31 which is connected to a main air pressure line 32 which divides into branches 33 and 34, one each of which is connected to the opposed air inlets 17 and 18. These air inlets 17 and 18 are arranged opposite each other so that they will simultaneously discharge between adjacent blades 16 while communicating with the discharge outlet 19 so that the pulverulent material between such blades will be simultaneously fluidized and discharged outwardly through the discharge outlet 19 in a substantially solid fluidized flow characterized by having a material to air ratio by weight of approximately 25 or more to one, respectively, and having a density many times (approximately 50) the bulk density of a pneumatic flow of the same material utilizing only a very small fraction of the air which would be required to convey the material in a pneumatic stream and appearing to have the same bulk density as the static bulk density of the material. A pressure guage 35 is connected to the main pressure line 32 to indicate the pressure generated by the blower 25.

In operation, the blower 25 induces a negative pressure within the separator 8 which in turn is transmitted through the suction conduit 7 to the bottom of the bin 5. As a result, the pulverulent material such as flour is drawn downwardly and through the suction conduit 7 in a fluidized substantially solid flow as hereinbefore described. The pulverulent material is discharged into the material inlet 12 and downwardly into the compartments defined by the rotating blades 16. It will be noted that the discharge outlet 11 of the suction conduit 7 extends along substantially the entire length of the blades 16 and directs the flow of the pulverulent material downwardly into the compartments between the blades 16 in the direction of rotation of the blades. The shaft 15 is provided with means for rotating the same as by a gear connected to a motor or a pulley 36 which in turn may be connected to a source of rotative power. The actuator 13 is rotated at a speed related to the admission of air through the air inlets 17 and 18 so that the volume of pulverulent material carried to the discharge outlet 19 is sufficient to produce a fluidized stream of the material characterized by having a material to air ratio by weight of approximately 25 or more to one, respectively.

Some of the air which is moving with the flour as it passes through the suction conduit 7 is entrapped between the blades 16 as they pass by the material inlet 12 and the remainder of the air escapes upwardly in the direction of the arrow shown in Fig. 1 and is drawn through the filters 21 by the negative presure induced by the blower 25. The filters serve to eliminate the dust particles which may be carried with the air and hence clean air is provided to the air intake 27 of the blower. The blower utilizes this same air to provide a flow of compressed air to the air inlets of the actuator which in turn fluidizes and conveys the pulverulent material introduced by the suction conduit. From this it can be seen that the entire flow from the bin 5 to the desired location is a fluidized substantially solid flow characterized by having a material to air ratio by weight of approximately 25 or more to one, respectively, and wherein the volume of air utilized is only a very small fraction of the volume of air which would be utilized in conveying the same amount of material by pneumatic conveying. As a result of the use of substantially less volumes of air to accomplish the withdrawal of the pulverulent material, and the subsequent conveyance thereof to the desired location, we have obviated the need for relatively expensive and bulky filters and effected the conveyance without the introduction of free air into the suction conduit. Thus it can be seen that with our apparatus it is possible to unload a railroad car or other container in a fluidized substantially solid flow of the material through which the need for expensive filter equipment is obviated.

The bleeder valve 30 is provided for use in the event that more air is needed by the blower 25 in order to accomplish the conveyance of the material through the discharge conduit 20 to a location far removed from the unloading system as shown. The greater the distance the pulverulent material must be conveyed by the actuator, the more pressure will be required. Thus if a relatively short suction conduit 7 is utilized, free air may be introduced through the bleeder valve 30 to provide more air for the blower 25 and thus a higher pressure may be provided at the air inlets 17 and 18.

It should be noted that the separator is disposed relatively close to the bin 5. This is imperative if the blower 25 is to be able to draw the pulverulent material from the bin 5 in a fluidized flow for the negative pressure induced by the blower 25 must be sufficient to overcome the friction of the conduit 7 in order to effect such a fluidized flow. By keeping the suction conduit 7 of relatively short length, it is possible for an induced negative pressure to be sufficient to withdraw the pulverulent material from the bin 5 and deliver it in a fluidized flow at the discharge outlet 11. Theoretically a blower should be able to induce a negative pressure approaching fourteen pounds per square inch but as a practical matter, a blower will induce a negative pressure at a maximum of around a negative ten pounds per square inch. This means that there is a definite limitation on the length of the suction conduit 7. We prefer to use a length of approximately eight feet while operating under a negative pressure of approximately 3.5 pounds per square inch. This would indicate that the suction conduit should preferably be no longer than 20 to 25 feet but in any event it must be sufficiently short so that the blower can induce a negative pressure sufficient to overcome the frictional forces provided by the side walls of the conduit 7 and the inertia of the pulverulent material. In other words, the negative pressure must be sufficient to cause the pulverulent material to flow through the suction conduit 7 in a fluidized flow characterized as hereinbefore described.

Figure 4:
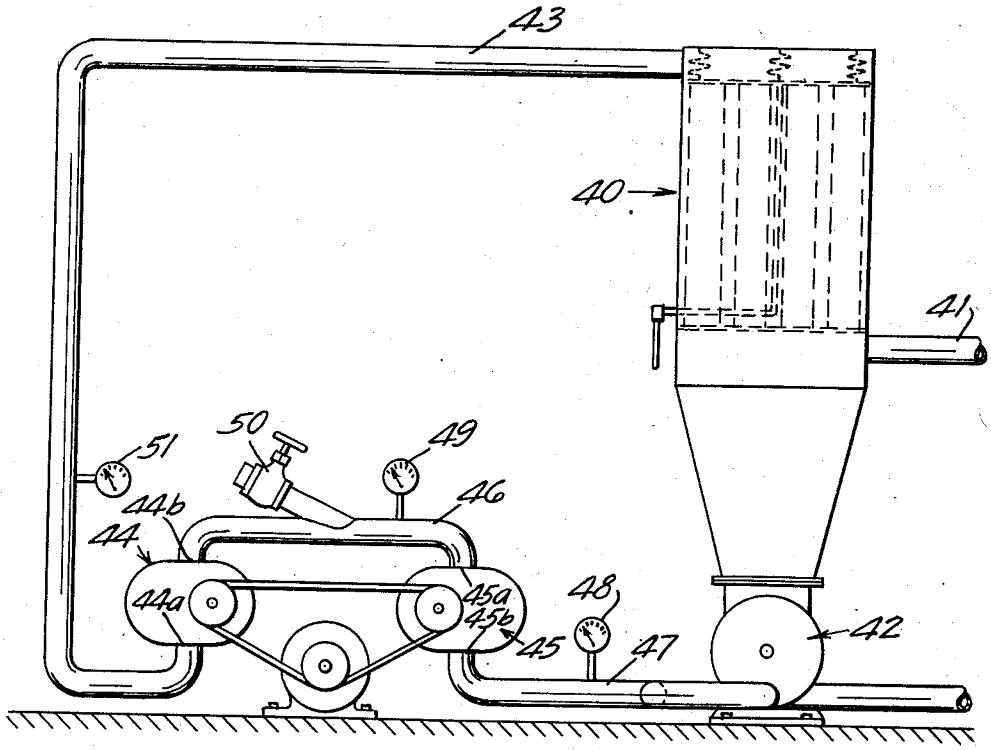
Fig. 4 is a diagrammatic view of a second embodiment of our invention.

Fig. 4 shows a modified form of our invention wherein the separator 40 is constructed identically with the separator 8 shown in Fig. 1 and the material is introduced through the suction conduit 41 in the same manner and discharged at the same point relative to the material inlet and the blades of the actuator 42. The acuator 42 is provided with dual air inlets and with a tangential discharge just as in the construction shown in Fig. 1 and a clean air conduit 43 withdraws the air from the top of the separator 40 and induces the necessary negative pressure in the suction conduit 41 to effect the fluidized flow of the pulverulent material therethrough. The pulverulent material flows through the suction conduit 41 in a fluidized flow characterized as hereinbefore described. The separator 40 is disposed closely adjacent to the bin or railroad car (not shown). The primary difference in this embodiment from that shown in Figs. 1–3 is the use of a pair of rotary-positive-type blowers 44 and 45 which, as shown, are arranged in tandem relation. The air discharge outlet **44*a* of the blower 44 is connected by a conduit 46 to the air intake 45*a* of the blower 45. The air discharge outlet of 45*b* of the blower 45 is connected by a compressed air conduit 47 which in turn is connected to the two branch lines which lead to the dual air inlets of the actuator 42. A presure gauge 48 is connected to the main compressed air line 47** as shown in Fig. 4.

It will be noted that there is a pressure guage 49 connected to the conduit 46 and that this conduit is provided with an air bleeder valve 50 through which air may be introduced into the conduit 46 when desired. A guage 51 is connected to the clean air conduit 43 to indicate the negative pressure induced.

The particular construction shown in Fig. 4 is designed for use in instances where the material must be moved unusually long distances after it is discharged by the actuator 42. In such instances it is sometimes necessary to provide a higher pressure per square inch than can be provided by a single blower when the necessary negative pressure is induced. For example, in an instance where a negative pressure of −3.5 p.s.i. is required to withdraw the pulverulent material in a fluidized flow into the separator 40, the amount of air provided to the blower might be insufficient to provide the necessary pressure for conveying the pulverulent material the desired distance. For that purpose, a second blower is connected in a tandem relation as shown with a bleeder valve 50 interposed between the two blowers to permit the entrance of additional air so that sufficient air will be provided to the two blowers so that they may together provide the desired pressure necessary to convey the pulverulent material in a fluidized flow the desired distance. In the operation of this construction, the entire flow of pulverulent material throughout the system is characterized as hereinbefore described and utilizes substantially less air than when the material is handled by pneumatic conveying. As a result and as a result of the discharge of the pulverulent material from the suction conduit immediately adjacent and into the compartments formed by the blades of the actuator 42 relatively simple and inexpensive filters are all that is required to clean the air before it is carried into the blowers. It should be noted that it is important that clean air be provided for these blowers for it has been found that if too much of the dust is permitted to pass into the blowers, the friction caused thereby within the blowers tends to cause them to fail and to utilize excessive quantities of power.

From the above it can be seen that we have provided a novel and improved unloading system for unloading pulverulent materials from railroad cars and the like which is substantially less expensive to construct and operate and makes it possible to effect the unloading of such containers by utilizing a fluidized flow throughout. The unloading systems disclosed herein obviate any requirement for large and expensive filters and have a minimum of power requirements to operate. The equipment required for these systems is substantially lower in cost than that utilized in conventional pneumatic unloading systems. We have found that we can reach capacities approaching 1,000 pounds of flour per minute.

It will, of course, be understood that various changes may be made in the form, details, arrangement and proportions of the parts without departing from the scope of our invention which consists in the matter shown and described herein and set forth in the appended claims.

What is claimed is:

1. In a conveying line from a source of material to a separator having a bladed rotor at the bottom thereof for withdrawing material from the separator and introducing the same into a compressed air line, a conduit having one end portion connected to the source of material and having a discharge terminal terminating at the bottom of said separator and directed into the path of the blades of the rotor whereby the formation of large quantities of dust in the conveyance of pulverulent material will be avoided.

2. The structure defined in claim 1 wherein said discharge terminal of said conduit is disposed immediately adjacent the blades of the rotor and is directed downwardly thereinto and is smaller in cross-sectional area than the area between the blades of the rotor.

3. The structure defined in claim 1 wherein said conduit has its discharge outlet disposed adjacent the blades of the rotor and directed thereinto only in the direction of rotation of the rotor and said discharge outlet is narrower transversely of the axis of said rotor than the distance between adjacent blades of said rotor.

4. The structure defined in claim 1 wherein the position of the discharge terminal of said conduit is offset in the direction of rotation of the uppermore blades of the rotor and is directed toward the blades of the rotor and radially thereof to facilitate the entrapment of pulverulent material between the blades and thereby reduce the formation of large quantities of dust.

5. In a conveying line from a source of material to a separator having a bladed rotor at the bottom thereof for withdrawing material from the separator and introducing the same into a compressed air line, a conduit having one end portion connected to the source of material and having a discharge terminal terminating adjacent the blades of the rotor and directed into the path of the blade of the rotor whereby the formation of large quantities of dust in the conveyance of pulverulent material will be avoided, said conduit having a discharge outlet with long and relatively narrow transverse dimensions disposed adjacent the blades of the rotor and extending along substantially the entire length thereof and being directed downwardly thereinto.

6. In a conveying line from a source of material to a separator having a bladed rotor at the bottom thereof for withdrawing material from the separator and introducing the same into a compressed air line, a conduit having one end portion connected to the source of material and having a discharge terminal terminating at the bottom of said separator and directed into the path of the blades of the rotor whereby the formation of large quantities of dust in the conveyance of pulverulent material will be avoided, said conduit having a discharge terminal so arranged that the uppermore blades of the rotor move horizontally toward the same during rotation of the rotor.

7. In a conveying line from a source of material to a separator having a bladed rotor at the bottom thereof for withdrawing material from the separator and introducing the same into a compressed air line, a conduit having one end portion connected to the source of material and having a discharge terminal terminating adjacent the blades of the rotor and directed into the path of the blades of the rotor whereby the formation of large quantities of dust in the conveyance of pulverulent material will be avoided, said conduit having a flattened discharge terminal terminating immediately adjacent the blades of the rotor and extending in its longest transverse dimensions axially of the rotor, the cross-sectional area of the discharge terminal being substantially equal to the cross-sectional area of the remainder of said conduit.

8. In a conveying line from a source of material to a separator having a bladed rotor at the bottom thereof for withdrawing material from the separator and introducing the same into a compressed air line, a conduit having one end portion connected to the source of material and having a discharge terminal terminating adjacent the blades of the rotor and directed into the path of the blades of the rotor whereby the formation of large quantities of dust in the conveyance of pulverulent material will be avoided, said discharge terminal of said conduit being flattened and extending in its longest transverse dimensions axially of the rotor.

References Cited in the file of this patent

UNITED STATES PATENTS

| | | |
|---|---|---|
| 2,539,109 | Webb | Jan. 23, 1951 |
| 2,630,350 | Berg | Mar. 3, 1953 |
| 2,643,159 | Bracket | June 23, 1953 |

FOREIGN PATENTS

| | | |
|---|---|---|
| 180,397 | Great Britain | May 11, 1922 |
| 268,667 | Great Britain | Apr. 7, 1927 |
| 1,015,881 | France | Aug. 13, 1952 |